United States Patent Office 3,544,653
Patented Dec. 1, 1970

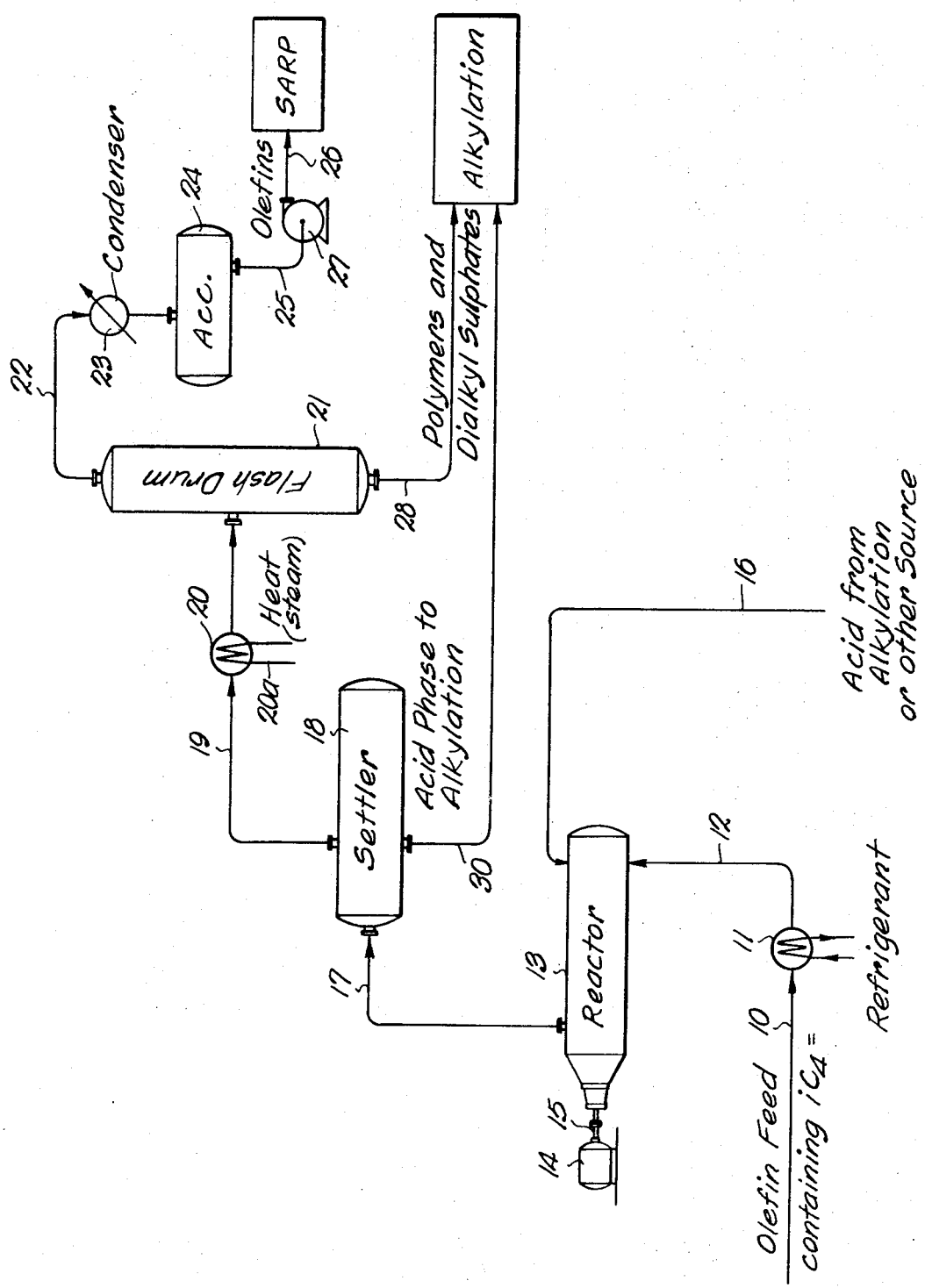

3,544,653
PREPARATION OF OLEFIN FEEDS FOR ACID RECOVERY PROCESSES
Orlando Webb, Jr., Shawnee Mission, Kans., Ward A. Graham, Kansas City, Mo., and Harry E. Massa, Prairie Village, Kans., assignors to Stratford Engineering Corporation, Kansas City, Mo., a corporation of Delaware
Continuation of application Ser. No. 593,367, Nov. 10, 1966. This application May 9, 1969, Ser. No. 824,394
Int. Cl. C07c 3/54, 11/00, 3/14
U.S. Cl. 260—683.61                          5 Claims

ABSTRACT OF THE DISCLOSURE

A process for preparing olefinic hydrocarbon containing feeds for use in sulfuric acid recovery processes, alkylation reactions and the like wherein isobutylene is removed from $C_4$ olefin containing (straight chain and isoolefins) hydrocarbon feed streams by strong acid of titratable strength equivalent to that of catalyst acid for alkylation reactions (conventionally defined as 85% $H_2SO_4$ acid or higher), and alkyl sulfates and isobutylene polymer are separated from the straight chain olefins and normal paraffinic hydrocarbons in the feed stream, the former passable to an alkylation reaction, the straight chain olefins passable to the absorption step of a sulfuric acid recovery process or a butadiene production process.

---

This application is a continuation of Ser. No. 593,367 filed Nov. 10, 1966.

This invention is an improvement of the processes seen in the application of Harry E. Massa, Ser. No. 495,191, filed Oct. 12, 1965, which issued as U.S. Pat. 3,442,972 on May 6, 1969, entitled "Alkylation of Alkyl Sulfates."

It is well known in the art to remove isobutylene from olefinic hydrocarbon carrying feed streams obtained from catalytic cracking processes and the like. Conventionally, however, such removal is carried out by cold acid treating or selective absorption processes using relatively weak acid strength for example, 65% $H_2SO_4$. The instant process contemplates the removal of such isobutylene content from such olefin streams by strong acid of titratable strength equivalent to that of catalyst acid for alkylation reactions, conventionally defined as 85% $H_2SO_4$ acid or better.

In study of the reactivity of pure butenes with strong sulphuric acid, the following was indicated: with respect to isobutylene, in vapor phase, involving reaction of isobutylene with 98% $H_2SO_4$, the reaction proceeded primarily to the monoalkyl sulfate and polymer with very little conversion to dialkyl sulfate. In liquid phase, the same reaction proceeded with explosive rapidity precluding the possibility of obtaining the desired result of dialkyl sulfate production. With respect to butene-1 and mixed butene-2, these olefins exhibited high conversion to dialkyl sulfates. The behavior of these latter olefins was similar to that of propylene.

An object of the instant invention is to improve the sulphuric acid recovery process of the Massa application, supra, by providing a convenient, effective method of removing isobutylene from $C_4$ olefin feed streams whereby to conserve the hydrocarbon values of said isobutylene for the alkylation process.

In practice of the sulphuric acid recovery process as disclosed in the Massa application, supra, an olefin containing feed stream is reacted with sulphuric acid to form dialkyl sulfate. It is preferred that an excess of olefin be employed whereby to provide a driving force to force the reaction through the monoalkylsulfate stage to the dialkyl sulfate stage. From the absorption step, a light hydrocarbon phase containing paraffins, such as propane, any unreacted olefin and dissolved alkyl sulfates is removed and typically passed to alkylation. The heavy phase of the absorption step is then passed to a step where dialkyl sulfates are extracted therefrom, typically employing isobutane from the alkylation unit, with elimination in the raffinate of water and polymeric contaminants originally present in the acid used in the absorption step. Optionally, then, the isobutane-alkyl sulfate extract may be treated with a small amount of spent alkylation acid to remove any polymeric contaminates not removed in the extraction step. The acid treated isobutane-alkyl sulfate extract is then charged to an alkylation unit for generation of 100% sulphuric acid and alkylate from the alkyl sulfates and isobutane.

In practice of the above typical sulphuric acid recovery process, when a $C_4$ olefin containing feed stream was deployed to the absorption step, and isobutylene was present, a great excess of acid soluble material was formed in the absorption step which, in the following hydrocarbon extraction process, would pass out of same with the elimination of water and polymeric contaminates, thus resulting in the loss of major acid and hydrocarbon values and making the sulphuric acid recovery process relatively uneconomic. Conversely, when a $C_4$ olefin containing feed stream free of isobutylene was deployed to the absorption step the production of dialkyl sulfates was accomplished with great efficiency. These were subsequently dissolved in the extraction step, appearing in the isobutane-dialkyl sulfate extract to the extent that over 90% of the original acid was recovered for subsequent release in the alkylation step. It is presumed that the cause of such loss when isobutylene was present was due to the formation of monoalkyl sulfates, which are weak acids and soluble in acids while essentially insoluble in hydrocarbon, and the isobutylene dimer. The latter, when fed to the absorption step of a sulphuric acid recovery process does not react to become a dialkyl sulfate and therefore hydrocarbon soluble, rather becomes a monoalkyl sulfate, a weak acid, soluble in acid and essentially insoluble in hydrocarbon.

Another object of the invention is to provide means and methods of utilizing the high yield of dialkyl sulfates when acid absorption of $C_4$ olefins is utilized without appreciable isobutylene being present.

Another object of the invention is to do away with the necessity of a hydrocarbon splitting step in sulphuric acid recovery process olefin feeds containing isobutylene.

Another object of the invention is to provide a method of removing isobutylene and higher isoolefins from olefinic hydrocarbon feed stocks containing same, leaving the straight chain olefinic hydrocarbons therewithin.

Another object of the invention is to provide means and methods to utilize sulphuric acid of alkylation catalyst strength in stoichiometric quantities or less (preferably less) for the purpose of removing isobutylene and like isoolefins from olefinic hydrocarbon feed stocks containing same, whereby the acid and hydrocarbon values of both the extracting acid and the extracted olefinic hydrocarbons are retained for the alkylation reaction without deteriorating the character of the straight chain olefinic hydrocarbon in the feed stream or requiring any substantial modification of the sulphuric acid recovery process.

An object of the invention is to provide feed pretreatment of butane-butylene feed streams with sulphuric acid to remove isobutylene therefrom whereby to result in an attractive, economical method of obtaining sulphuric acid recovery process benefits to units processing butenes only or same processing mixed propylenes and butylenes.

Another object of the invention is to provide a process for treating isobutylene containing $C_4$ olefin feed streams with an acid dosage representing less than the stoichiometric amount of acid required for reaction with isobutylene to form monobutyl sulfate, yet wherein all of the isobutylene may be removed from the feed stock.

Other and further objects of the invention will appear in the course of the following description thereof.

In the drawing, which forms a part of the instant specification and is to be read in conjunction therewith, an embodiment of the subject process is shown.

The figure is a schematic flow diagram of apparatus for treating olefin-containing hydrocarbon feeds in such manner as to remove isobutylene or isoolefinic hydrocarbons therefrom in such manner as to leave the straight chain of olefinic hydrocarbons in condition for immediate charge to a sulphuric acid recovery process or the like and the isoolefinic hydrocarbons or isobutylene in condition for immediate charge to an alkylation reaction zone.

Referring to the figure at 10 is seen a feed line carrying an isobutylene or isoolefinic containing component, such feed typically from a catalytic cracking operation comprising an olefinic hydrocarbon containing feed stream. Such a typical "B-B" (butane-butene) feed stream might be of the following composition: $C_3$ 1.4% (propane and propene), isobutane 31.5%, normal butane 12.7%, isopentane 5.2%, trans butene-2 16.2%, isobutylene 13.9%, butene-1 9.1%, cis butene-2 9.9%. At 11, a heat exchanger, the feed stream is cooled and, thereafter, through line 12, same is passed into reactor 13. This preferably comprises a Stratford Engineering Corporation Contactor, but may be any suitable mixing vessel to comprise intimate mixing of acid and feed stream. The mixer, impeller or circulating means in the reaction vessel is driven by motor 14 through shaft 15. Suitable contacting vessels may be seen in the patent to Putney 2,979,308, issued Apr. 11, 1961, "Apparatus for Controlling Temperature Change, Etc." Acid from alkylation or other source of a titratable acidity above 85%, whereby to be a suitable alkylation catalyst, preferably 90–98%, is fed in through line 16 to reactor 13. In reactor 13, the acid and feed stream hydrocarbons are thoroughly mixed, with the reactor effluent passing off overhead through line 17. From line 17, the effluent comprising dialkyl sulfates, monoalkyl sulfates, paraffinic hydrocarbons, straight chain olefins and isobutylene dimer pass into a gravity separation step at 18.

Thus, the butenes supplied through line 10 are a mixture of the type normally produced by fluid catalytic cracking or coking and contain appreciable isobutylene. They are typically available in the form of a full range butane-butene cut. Using the isobutylene extraction concept of the instant improvement, this butane-butylene feed stock is charged to contactor 13 and reacted with a stoichiometric deficiency re formation of monobutyl sulfate of said strong sulphuric acid. This represents one mol of $H_2SO_4$ with respect to one mol of isobutylene. If the instant apparatus is in a plant designed to alkylate isoparaffinic hydrocarbons, say, and butylenes, the fresh makeup acid to the alkylation plant could be employed although one could also use with or supplement this with a portion of the acid that has separated in the alkylation acid settler.

With a deficiency of acid and appropriate operating conditions, a high degree of selectivity in removing isobutylene from the B-B mixture is achieved, isobutylene having a reaction rate of about 20 times that of the other butylene olefins. This selective driving force is very high when compared to relative volatility differences used in fractional distillation, relative solubilities used in solvent extractions, and relative densities that are sometimes used in gravity separation. We have found that isobutylene can be removed from the olefin containing HC feed stream at 10 by utilization of 0.15 mol of $H_2SO_4$ per mol of isobutylene present.

The isobutylene extraction is accomplished without significant alkylation occurring in this step because (1) the sulphuric acid is rapidly diluted to a low titratable acidity and thus its effectiveness as an alkylation catalyst is greatly reduced and eliminated; (2) there is a very low isobutane concentration in the B-B feed compared to normal minimum alkylation operating conditions.

At 18, the mixture leaving the extraction contactor is separated into two phases. The light phase, to be passed overhead through line 19, is essentially free of isobutylene. The heavy phase from the isobutylene extraction settler, to be passed via line 30 to alkylation or other use, will contain a certain amount of usable hydrocarbon values in the form of alkyl sulfates produced by the reaction of acid with olefins, particularly isobutylene. For optimum economic benefits these values should be recovered by further processing, preferably and most simply by sending this stream to alkylation wherein the alkyl sulfates will react, forming alkylate and releasing $H_2SO_4$.

The acid treating stage shown at 13 and the first separation step seen at 18 may be combined in a single stage by employing such apparatus as a time tank, a counter current packed column, a rotating disc contactor and the like.

With respect to conditions in reactor 13, the amount of sulphuric acid fed is regulated to that needed only for removal of isobutylene (stoichiometric or less). The time in the contactor is kept to a minimum. Considerable heat of reaction must be removed from the system. The amount depends on the quantity of isobutylene in the B-B feed. The heat of reaction may be removed either by prechilling the B-B feed as at 11 or by incorporating a cooled heat exchange bundle in the contactor or both. In reactor 13, at an acid dosage representing less than the stoichiometric amount of acid required for reaction with isobutylene to form monobutyl sulfate, all of the isobutylene may be removed from the feed stock.

While it has been recognized and demonstrated that isobutylene can be removed from a mixed olefin stream with reasonable selectivity by treatment with strong sulphuric acid, including alkylation acid catalyst, under certain conditions, however, the isobutylene will be polymerized to some extent and the resulting polymer is much more soluble in the hydrocarbon phase than in the acidic phase of the reaction mixture. Upon separation of the reaction mixture as at 18, the hydrocarbon phase can contain some polymer of the isobutylene, as well as straight chain olefins.

For some purposes, such as the production of butadiene or recovery of sulphuric acid by the SARP process as in Massa 495,191, supra, the presence of isobutylene polymers may be undesirable. In these cases, a separate step may be incorporated in the treating process consisting of an equilibrium flash vaporization step for removal of polymers or a fractionation step for relatively complete separation of the polymers and the straight chain olefins. Since, in the case of isobutylene, the simplest polymer is the $C_8$ dimer, such equilibrium flash will provide adequate separation, particularly when the dimer rich stream undergoes further processing such as alkylation.

Therefore, through line 19, there is passed the hydrocarbon phase, containing any paraffinic hydrocarbons, straight chain olefins, isobutylene dimer, and HC soluble alkyl sulfate. Same are heated at 20 in heat exchanger heated by line 20a and the heated hydrocarbon phase effluent from settler 18, both liquid and vapor, are passed to flash drum 21. A polymer-free overhead or vapor product containing straight chain olefins is passed off through line 22 to condenser 23 and thence to accumulator drum 24. The liquid from accumulator drum 24 is passed through lines 25 and 26, driven by pump 27, to any desired reaction, such as the absorption step of a sulphuric acid recovery process as seen in Massa 495,191, supra. The bottoms or liquid stream from flash drum 21, comprising polymer and alkyl sulfates and any unvaporized $C_4$'s is passed via line 28 to alkylation.

Due to the presence of some dialkyl sulfates in the hydrocarbon phase from the acid treating step, the vaporization step at 20 should be carried out at relatively low temperatures to avoid decomposition of the alkyl sulfates and subsequent loss of acid and olefinic values therein.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A process for treating an olefin containing hydrocarbon stream which has both straight chain olefins and isobutylene therein to separate said isobutylene from said straight chain olefins comprising:

contacting the olefin containing stream with a quantity of sulfuric acid of titratable acidity 85% or greater in a reaction step wherein substantially all of the isobutylene is reacted to polymers and butyl sulfates while leaving unreacted substantially all of the straight chain olefins present in the original hydrocarbon stream, said acid quantity in said reaction step being sufficient to react all isobutylene to polymers or butyl sulfates but less than equal molar quantity to the isobutylene present in said stream, separating the reaction effluent stream into a hydrocarbon phase containing butylene polymers, straight chain olefins and any paraffinic hydrocarbons in said stream and an acidic phase containing butyl sulfates and any unreacted sulfuric acid, and then vaporizing a light fraction containing substantially all of the straight chain olefins present in the original hydrocarbon stream from said hydrocarbon phase to produce a heavy fraction including isobutylene polymers and butyl sulfates.

2. A process as in claim 1 including the step of passing the heavy fraction and the acidic phase to an alkylation reaction zone wherein isoparaffinic hydrocarbons are reacted with olefinic hydrocarbons in the presence of sulfuric acid catalyst to form alkylate, and the step of passing the light fraction containing the straight chain olefins to an absorption step wherein they are absorbed in spent sulfuric alkylation acid from an alkylation reaction zone for the formation of dialkyl sulfates.

3. A process as in claim 1 wherein the quantity of said sulfuric acid is as low as 0.15 mole per mole of isobutylene present in said reaction step.

4. A process as in claim 1 wherein said vaporization of the hydrocarbon phase comprises a flash vaporization step.

5. A process as in claim 1 wherein the sulfuric acid employed in the reaction step comprises used acid catalyst from a sulfuric acid alkylation reaction.

References Cited

UNITED STATES PATENTS

| | | | |
|---|---|---|---|
| 2,334,861 | 11/1943 | Bowles | 260—683.61 |
| 2,355,460 | 8/1944 | Morrell | 260—683.61 |
| 2,381,041 | 8/1945 | De Jong | 260—683.61 |
| 2,420,369 | 5/1947 | Goldsby | 260—683.61 |
| 2,438,456 | 3/1948 | Russell et al. | 260—683.61 |

DELBERT E. GANTZ, Primary Examiner

G. J. CRASANAKIS, Assistant Examiner

U.S. Cl. X.R.

260—677, 683.15